(12) United States Patent
Kosowski et al.

(10) Patent No.: US 11,281,371 B1
(45) Date of Patent: Mar. 22, 2022

(54) INTERFACE FOR PRESENTING MEDIA COLLECTIONS

(71) Applicant: GoPro, Inc., San Mateo, CA (US)

(72) Inventors: Evan Kosowski, San Diego, CA (US); Joshua Hamill, Poway, CA (US); Nicholas Woodman, Big Sky, MT (US); Christopher James Frost, San Mateo, CA (US); Otto Sievert, Oceanside, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 16/949,193

(22) Filed: Oct. 19, 2020

(51) Int. Cl.
*G06F 3/0488* (2013.01)
*G06F 3/0484* (2013.01)
*G06F 3/04883* (2022.01)
*G06F 3/04845* (2022.01)

(52) U.S. Cl.
CPC ...... *G06F 3/04883* (2013.01); *G06F 3/04845* (2013.01)

(58) Field of Classification Search
CPC ... G06F 3/04883; G06F 3/04845; G06F 3/048
See application file for complete search history.

(56) References Cited

U.S. PATENT DOCUMENTS

| | | | |
|---|---|---|---|
| 2010/0174993 A1* | 7/2010 | Pennington | G06F 3/04817 715/738 |
| 2010/0199227 A1* | 8/2010 | Xiao | G06F 3/0481 715/863 |
| 2012/0072863 A1* | 3/2012 | Akifusa | G06F 3/0482 715/784 |
| 2013/0198661 A1* | 8/2013 | Matas | G06F 9/451 715/762 |
| 2013/0238724 A1* | 9/2013 | Cunningham | G06F 3/04842 709/206 |
| 2014/0282011 A1* | 9/2014 | Dellinger | G06F 3/04845 715/731 |
| 2019/0025999 A1* | 1/2019 | Murphy | G06F 3/04817 |

\* cited by examiner

*Primary Examiner* — Frank D Mills
*Assistant Examiner* — Bille M Dahir
(74) *Attorney, Agent, or Firm* — Esplin & Associates, PC (57) ABSTRACT

A graphical user interface for presenting media collections may provide multiple levels of view of different collections of media items. Individual levels of view may include different layouts for the media items.

20 Claims, 5 Drawing Sheets

METHOD 200

201
Obtain media collection information, the media collection information defining collections of media items.

202
Present a graphical user interface on a display, the graphical user interface providing multiple levels of view of the collections of the media items, individual levels of view including a different layout for the media items

FIG. 5

INTERFACE FOR PRESENTING MEDIA COLLECTIONS

FIELD

This disclosure relates to an interface for presenting media collections.

BACKGROUND

A user may have numerous media items (e.g., images, videos). Presenting the media items in an organized matter may facilitate user consumption of the media items.

SUMMARY

This disclosure relates to an interface for presenting media collections. Media collection information and/or other information may be obtained. The media collection information may define collections of media items. A graphical user interface may be presented on a display. The graphical user interface may provide multiple levels of view of the collections of the media items. Individual levels of view may include a different layout for the media items. The multiple levels of view may include a first level of view, a second level of view, and/or other levels of view. The first level of view may include a first layout for the media items and the second level of view may include a second layout for the media items. The first layout for the media items may be different from the second layout for the media items.

A system that presents an interface for media collections may include one or more electronic storage, processor, and/or other components. The electronic storage may store media collection information, information relating to media items, information relating to collections of media items, information relating to graphical user interface, information relating to levels of view, and/or other information.

The processor(s) may be configured by machine-readable instructions. Executing the machine-readable instructions may cause the processor(s) to facilitate presenting an interface for media collections. The machine-readable instructions may include one or more computer program components. The computer program components may include one or more of a media collection component, a graphical user interface component, and/or other computer program components.

The media collection component may be configured to obtain media collection information and/or other information. The media collection information may define collections of media items.

The graphical user interface component may be configured to present a graphical user interface on a display. The graphical user interface may provide multiple levels of view of the collections of the media items. Individual levels of view may include a different layout for the media items. The multiple levels of view may include a first level of view, a second level of view, and/or other levels of view. The first level of view may include a first layout for the media items and the second level of view may include a second layout for the media items. The first layout for the media items may be different from the second layout for the media items.

In some implementations, the multiple levels of view may include a summary view, a tile view, and a zoom view. In some implementations, the graphical user interface may change among the summary view, the tile view, and the zoom view based on pinching or stretching gesture received through a touchscreen display and/or other information.

In some implementations, the summary view may include individual collections arranged in a first direction and individual media items within the individual collections arranged in a second direction perpendicular to the first direction. For example, the individual collections may be arranged vertically such that a first collection is above a second collection in the summary view. The individual media items within the individual collections may be arranged horizontally such that a first media item of the first collection is left of a second media item of the first collection in the summary view.

In some implementations, the tile view may include individual media items within individual collections arranged as tiles. The individual media items within different collections may be arranged in different rows or different columns in the tile view.

In some implementations, the zoom view may include a preview section for individual media items within a single collection. The preview section may provide a preview of the individual media items within the single collection. The individual media items within the single collection may be arranged below the preview section. In some implementations, order of the individual media items arranged below the preview section may be changeable to change order of presentation of corresponding media items within the single collection. In some implementations, a representative image for the single collection may be generated from a first media item based on a user dropping the first media item in the preview section.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
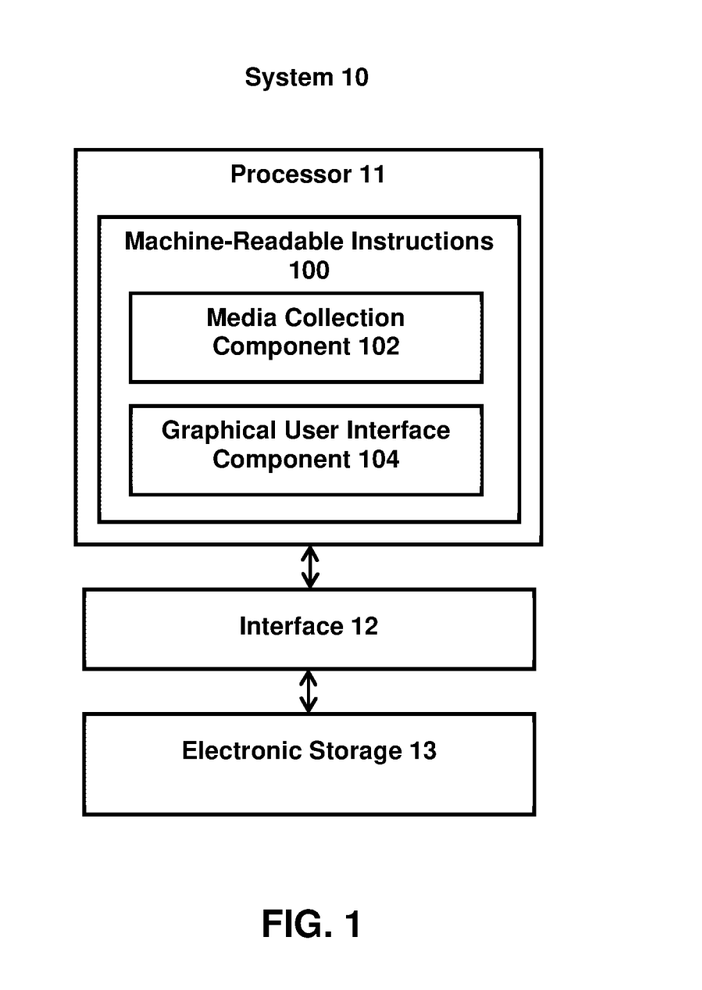
FIG. 1 illustrates a system that presents an interface for media collections.

FIG. 1 illustrates a system 10 that presents an interface for media collections. The system 10 may include one or more of a processor 11, an interface 12 (e.g., bus, wireless interface), an electronic storage 13, and/or other components. Media collection information and/or other information may be obtained by the processor 11. The media collection information may define collections of media items. A graphical user interface may be presented on a display by the processor 11. The graphical user interface may provide multiple levels of view of the collections of the media items. Individual levels of view may include a different layout for the media items. The multiple levels of view may include a first level of view, a second level of view, and/or other levels of view. The first level of view may include a first layout for the media items and the second level of view may include a second layout for the media items. The first layout for the media items may be different from the second layout for the media items.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store media collection information, information relating to media items, information relating to collections of media items, information relating to graphical user interface, information relating to levels of view, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate presenting an interface for media collections. The machine-readable instructions 100 may include one or more computer program components. The machine-readable instructions 100 may include one or more of a media collection component 102, a graphical user interface component 104, and/or other computer program components.

The media collection component 102 may be configured to obtain media collection information and/or other information. Obtaining media collection information may include one or more of accessing, acquiring, analyzing, determining, examining, generating, identifying, loading, locating, opening, receiving, retrieving, reviewing, selecting, storing, and/or otherwise obtaining the media collection information. The media collection component 102 may obtain media collection information from one or more locations. For example, the media collection component 102 may obtain media collection information from a storage location, such as the electronic storage 13, electronic storage of information and/or signals generated by one or more sensors, electronic storage of a device accessible via a network, and/or other locations. The media collection component 102 may obtain media collection information from one or more hardware components (e.g., an image sensor, a sound sensor) and/or one or more software components (e.g., software running on a computing device).

In some implementations, the media collection component 102 may obtain media collection information based on user interaction with a user interface/application (e.g., media editing application, media player application), and/or other information. For example, a user interface/application may provide option(s) for a user to select media items/collections of media items to be presented. The media collection information may be obtained based on the user's selection of the media items/collections of media items through the user interface/video application (e.g., direct selection of the media items/collections of media items; indirect selection of the media items/collections of media items, selection of devices, folders, category, metadata relating to the media items/collections of media items). Other selections of media items/collections of media items for retrieval of media collection information are contemplated.

The media collection information may define one or more collections of media items. A collection of media item may refer to a group of media items. A collection of media items may include one or more media items. Media items may be included within a collection of media items manually (e.g., manual selection of media items by a user for inclusion within a collection) and/or automatically (e.g., automatic selection of media items by software/algorithm for inclusion within a collection). For example, a collection of media items may include media items grouped together based on when they were captured (e.g., grouping based on similar/same time/day/month/season/year of capture), where they were captured (e.g., grouping based on similar/same location/area of capture), what they captured (e.g., grouping based on similar/same type of activity/entity/scene captured), and/or other factors.

Media items may refer to items that may be visually and/or audibly consumed. Media items may refer to multimedia items. For example, media items may include images, slideshows, videos, and/or other media items. Individual media items may be stored in a single file or in multiple files. Multiple media items may be stored in a single file or in multiple files. A collection of media items may include a group of same type of media items or a group of different types of media items. Media items may be associated with metadata relating to capture and/or processing of the media items.

Media collection information may define a collection of media items by including information that defines one or more content, qualities, attributes, features, and/or other aspects of the collection of media items. For example, the media collection information may define a collection of media items by including information that makes up the content of the collection of media items and/or information that is used to determine the content of the collection of media items. For instance, the media collection information may include information that makes up and/or is used to determine media items within the collection of media items (e.g., information defining content of images, slideshows, video), information that defines and/or is used to determine which media items are included within the collection of media items, and/or other information that defines the collection of media items. The media collection information may be stored within a single file or multiple files. Other types of media collection information are contemplated.

The graphical user interface component 104 may be configured to present one or more graphical user interfaces on one or more displays. A display may refer to an electronic device that provides visual presentation of information. A display may be configured to present graphical user interfaces, media items, and/or other information. In some implementations, a display may include a touchscreen display. A touchscreen display may be configured to receive user input via a user's engagement with the touchscreen display. A user may engage with the touchscreen display via interaction with one or more touch-sensitive surfaces/screens and/or other components of the touchscreen display. A display may be a standalone device or a component of a computing device, such as a display of a mobile device (e.g., camera, smartphone, smartwatch, tablet, laptop) or a desktop device (e.g., touch monitor). User interaction with the graphical user interface may be received through the display (e.g., touchscreen display) and/or other user interface devices (e.g., keyboard, mouse, trackpad).

A graphical user interface may refer to a user interface that enables a user to interact with the system 10. A graphical user interface may refer to a user interface that enables the system 10 to provide information to a user. A graphical user interface may include interface elements. An interface element may refer to a graphical element of the user interface, such as window, icon, button, graphic, and/or other visual indicator. An interface element may visually provide information and/or enable a user to provide inputs to the system 10. For example, an interface element may visually provide information determined by the system 10 and/or a user may interact (e.g., engage, toggle, manipulate) with an interface element to provide one or more input to the system 10. For instance, interface elements may include previews of media items/collections of media items, and the interface items may be arranged within the graphical user interface to provide multiple levels of view of the media items/collections of media items. A user may interact with the previews to interact with the corresponding media item/collection of media items. Other interface elements are contemplated.

A graphical user interface may facilitate interaction of the user with one or more of the interface elements via the user input received through one or more user interface devices (e.g., touchscreen display, keyboard, mouse, trackpad) and/or other user input. For example, a graphical user interface may present/include the interface elements in a particular arrangement and enable the user to interact with individual interface elements by engaging with locations corresponding to the individual interface elements on a touchscreen display.

A graphical user interface may be static or dynamic. A graphical user interface may include a static configuration of interface elements and/or include dynamic configurations of interface elements that changes (e.g., with time, based on user interaction with the graphical user interface). Multiple/different interface elements may be presented/included within a graphical user interface at the same time, may be presented/included within a graphical user interface at different times, and/or may be presented/included within a graphical user interface responsive to user interaction with the graphical user interface, and/or other information.

A graphical user interface may provide multiple levels of view of the collections of media items. A level of view of the collection of media items may refer to a particular arrangement of the collection of media items/the media items. Individual levels of view may include a different layout for the media items. That is, the graphical user interface may provide different levels of view of the collections of media items, with the collections of media items/the media items arranged differently. For example, the multiple levels of view may include a first level of view, a second level of view, and/or other levels of view. The first level of view may include a first layout for the media items and the second level of view may include a second layout for the media items. The first layout for the media items may be different from the second layout for the media items.

The multiple levels of view of the collections of media items may form a hierarchy of levels. Different levels of view may occupy a different position in the hierarchy of levels. For example, the multiple levels of view may include a summary view, a tile view, and a zoom view. The hierarchy of levels may include, in order, the summary view, the tile view, and then the zoom view. Other levels of view are contemplated.

The summary view may provide a higher level (zoomed out) view of the collection of media items/the media items than the tile view or the zoom view. The summary view may include individual collections of media items arranged in one direction and individual media items within the individual collections arranged in a perpendicular direction. For example, individual collections of media items may be arranged vertically such that one collection is above/below another collection in the summary view. Individual media items within individual collections may be arranged horizontally such that a media item of a collection is left/right of another media item of the collection in the summary view.

The tile view may provide an intermediate level of view between the summary view and the zoom view. The tile view may include individual media items within individual collections arranged as tiles. That is, individual media items may be visually presented as tiled in the tile view. Individual media items within different collections may be arranged in different rows or different columns in the tile view. A user may be able to distinguish between media items contained within different collections based on rows/columns in which the tiles are presented.

The zoom view may provider a lower level (zoomed in) view of the view of the collection of media items/the media items than the summary view or the tile view. The zoom view may include one or more preview sections, with a single preview section for individual media items within a single collection. A preview section may provide a preview of individual media items within the single collection. For example, the preview section may cycle through different media items within the single collection, show snippets of videos within the single collection, and/or provide a preview of how the collection would be shown when played. The zoom view may include individual media items within the single collection arranged below the preview section.

Inclusion of media items within the summary view, the tile view, and/or the zoom view may include inclusion of a preview of the media items. For example, inclusion of media items within the summary view, the tile view, and/or the zoom view may include inclusion of thumbnails of the media items within the summary view, the tile view, and/or the zoom view.

The graphical user interface may present the collection of media items/the media items on the displays using a single level of view at a time. The graphical user interface may change among the different levels of view based on user input and/or other information. For example, based on user input to zoom in, the graphical user interface may change from the summary view, to the tile view, to the zoom view. Based on user input to zoom out, the graphical user interface may change from the zoom view, to the tile view, to the summary view.

User input to change among the different levels of view may be received through user interaction with one or more user interface devices, such as through touchscreen display, keyboard, mouse, and/or trackpad. For example, a user may provide input to the system 10 to zoom out from a lower level of view to a higher level of view by making pinching gesture on a touchscreen display. For instance, the graphical user interface may change from the zoom view to the tile view, or from the tile view to the summary view based on pinching gesture received through a touchscreen. As another example, a user may provide input to the system 10 to zoom in from a higher level of view to a lower level of view by making stretching gesture on a touchscreen display. For instance, the graphical user interface may change from the summary view to the tile view, or from the tile view to the zoom view based on stretching gesture received through a touchscreen display. Other user input to change among the different levels of view are contemplated.

Figure 3:
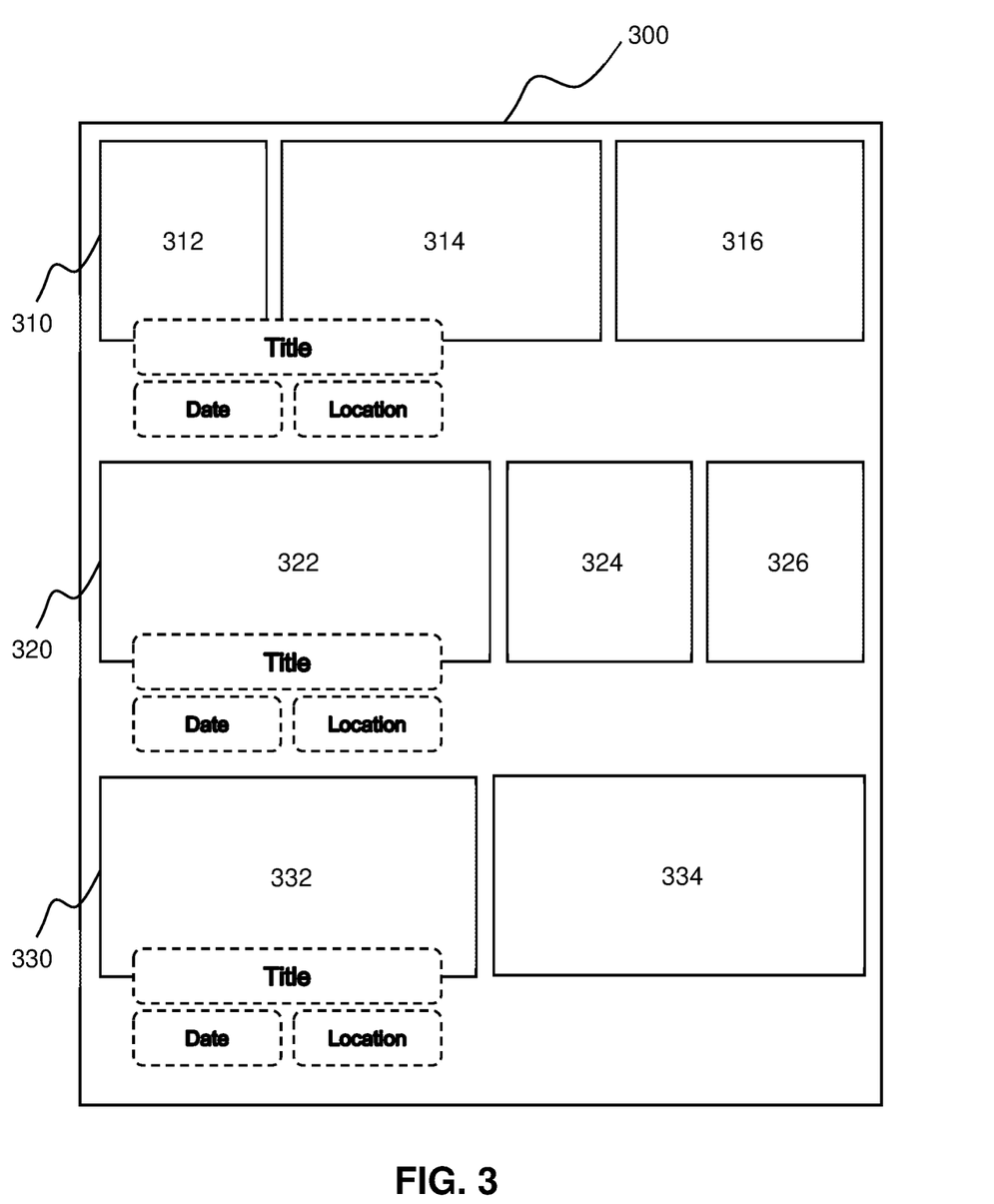
FIG. 3 illustrates an example summary view.
Figure 4:
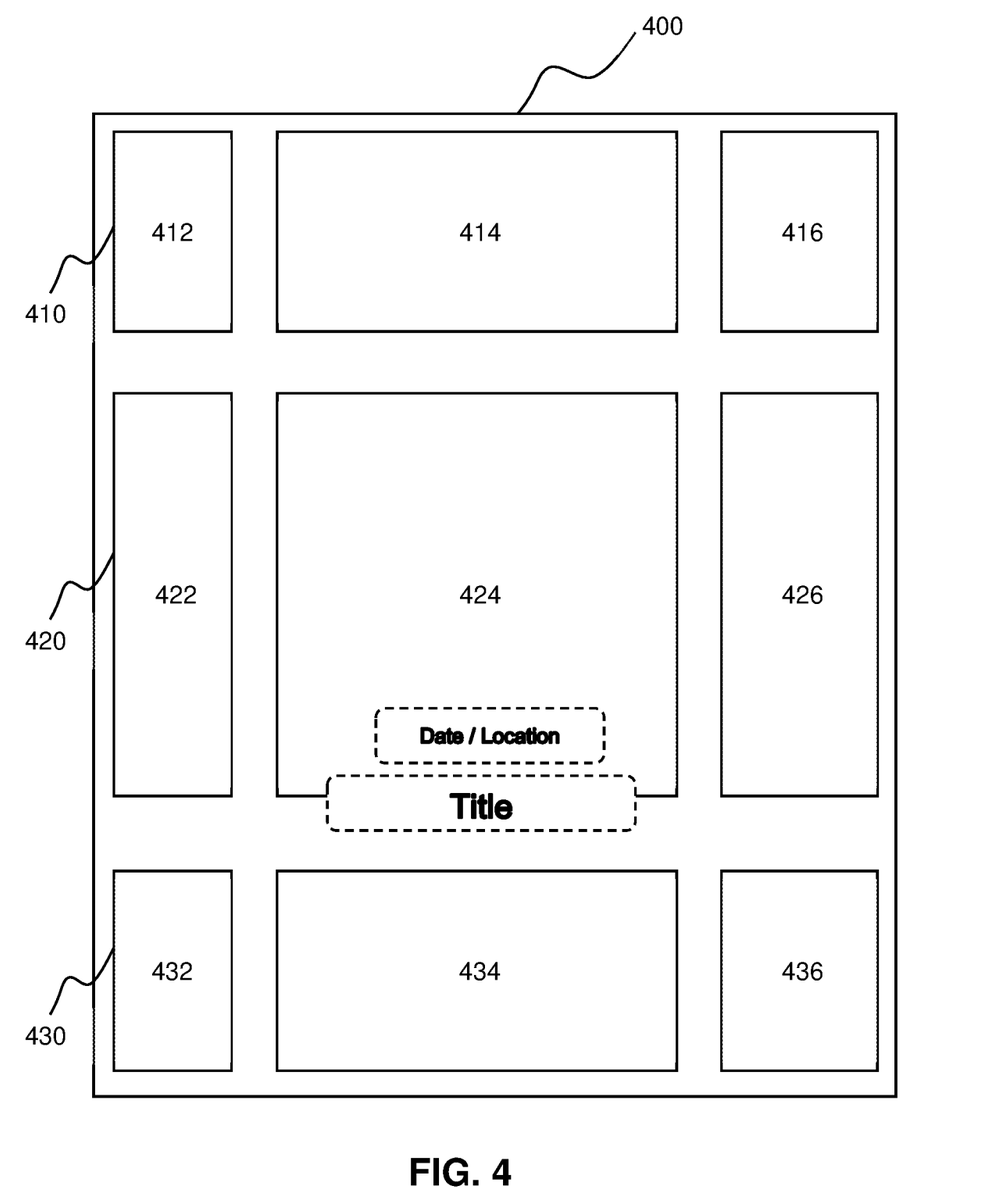
FIG. 4 illustrates an example tile view.
Figure 5:
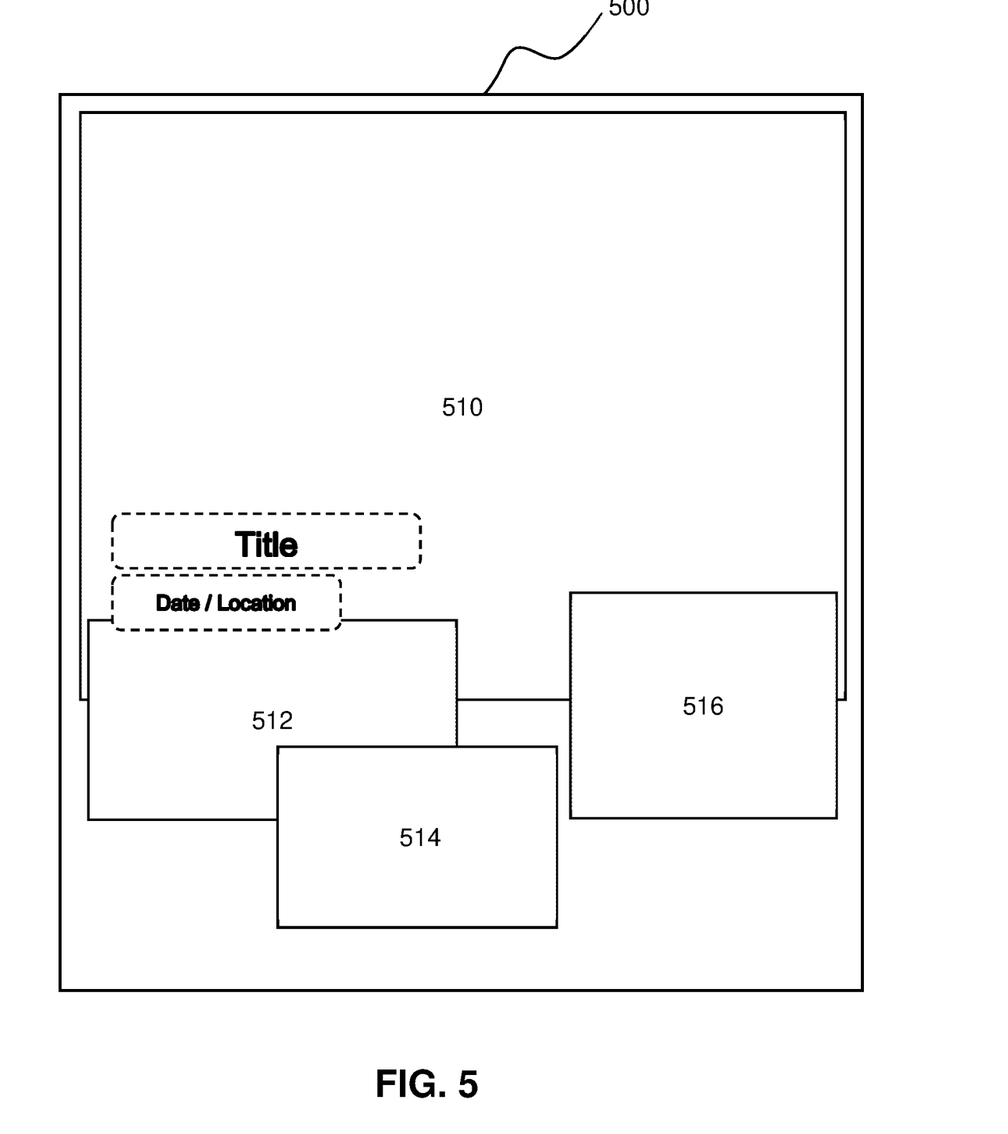
FIG. 5 illustrates an example zoom view.

FIGS. 3, 4, and 5 illustrate example graphical user interface with different levels of view. These graphical user interfaces and layouts for media items are provided merely as examples, and the arrangement and visual aspects of the graphical user interfaces and the layout of media items may vary depending on the implementation. In some implementations, the graphical user interfaces may include additional features and/or alternative features.

FIG. 3 illustrates an example summary view 300. The summary view 300 may include a layout for media items in which individual collections of media items are arranged in one direction and individual media items within the individual collections are arranged in a perpendicular direction. For instance, collections of media items may be arranged vertically while individual media items within the collections may be arranged horizontally, or vice versa. For example, as shown in FIG. 3, the summary view 300 may include collections 310, 320, 330 arranged vertically such that the collection 310 is above the collection 320, and the collection 320 is above the collection 330. Individual media items within the collections 310, 320, 330 may be arranged horizontally.

For example, the collection 310 may include media items 312, 314, 316. The media items 312, 314, 316 may be arranged so that the media item 312 is to the left of the media item 314, and the media item 314 is to the left of the media item 316. The collection 320 may include horizontally arranged media items 322, 324, 326, and the collection 330 may include horizontally arranged media items 332, 324. Presentation of other numbers of collections and media items are contemplated.

The summary view 300 may present information relating to the collections 310, 320, 330 and/or the media items within the collections 310, 320, 330. For example, the summary view 300 may present titles of the collections 310, 320, 330 below the collections 310, 320, 330. The summary view 300 may present date and location of capture for the collections 310, 320, 330 below their respective titles. Presentation of other information and other arrangements of related information are contemplated.

The summary view 300 may not present all collections/media items at once. For example, in FIG. 3, there may be collections above and/or below the collections 310, 320, 330. There may be media items to the left or right of the media items 312, 314, 316, 322, 324, 326, 332, 324. A user may interact with the graphical user interface to see other collections and/or other media items. For example, a user may scroll up and down in the summary view 300 to see other collections. A user may scroll left and right in the summary view 300 to see other media items. Scrolling to see other media items may affect presentation of a single collection or multiple collection. For example, responsive to a user make a left panning gesture to along the collection 320, the media items 322, 324, 326 may be moved to the left to bring other media items of the collection 320 to the right into view. As another example, responsive to a user make a left panning gesture to along the collection 320, the media items 312, 314, 316, 322, 324, 326, 332, 334 may be moved to the left to bring other media items of the collections 310, 320, 330 to the right into view.

FIG. 4 illustrates an example tile view 400. The tile view 400 may include a layout for media items in which individual media items within individual collections are arranged as tiles. Individual media items within different collections may be arranged in different rows or different columns in the tile view 400. For example, as shown in FIG. 4, the tile view 400 may include media items 412, 414, 416, 422, 424, 426, 432, 434, 436 represented as tiles. The media items 412, 414, 416 within a collection 410 may be presented in the top row, the media items 422, 424, 426 within a collection 420 may be presented in the middle row, and the media items 432, 434, 436 within a collection 430 may be presented in the bottom row. Presentation of other numbers of collection and media items are contemplated.

In the tile view 400 shown in FIG. 4, only the middle tile may include full presentation of the tile. That is, only the tile for the media item 424 may be presented in full, while other tiles around the middle tile may be presented partially. For example, the tile view 400 may show bottom right corner of the media item 412, bottom portion of the media item 414, bottom left corner of the media item 416, right portion of the media item 422, left portion of the media item 426, top right corner of the media item 432, top portion of the media item 434, and top left corner of the media item 436.

The tile view 400 may present information relating to the collection 410, 420, 430 and/or the media items within the collections 410, 420, 430. For example, the tile view 400 may present the title, date of capture, and/or location of capture of the center-tile media item (e.g., the media 424). In some implementations, the tile view 400 may present same/similar information for other media items. For example, the tile view 400 may present same/similar information for all media items within the tile view 400. As another example, the tile view 400 may present same/similar information for all media items within the tile view 400 that are presented in full. For example, rather than having a single/center tile presented in full, a group of tiles in the center of the tile view 400 may be presented in full (while tiles in the periphery of tile view 400 may be partially presented). The group of tiles in the center of the tile view 400 may be overlaid with information relating to title, date of capture, location of capture, and/or other information. Presentation of other information and other arrangements of related information are contemplated.

The tile view 400 may not present all collections/media items at once. For example, in FIG. 4, there may be collections above and/or below the collections 410, 420, 430. There may be media items to the left or right of the media items 412, 414, 416, 422, 424, 426, 432, 434, 346. A user may interact with the graphical user interface to see other collections and/or other media items. For example, a user may scroll up and down in the tile view 400 to see other collections. A user may scroll left and right in the tile view 400 to see other media items. Scrolling to see other media items may affect presentation of a single collection or multiple collection. For example, responsive to a user make a left panning gesture to along the collection 420, the media items 422, 424, 426 may be moved to the left to bring other media items of the collection 420 to the right into view. As another example, responsive to a user make a left panning gesture to along the collection 420, the media items 412, 414, 416, 422, 424, 426, 432, 434, 436 may be moved to the left to bring other media items of the collections 410, 420, 430 to the right into view.

While the tiles of the tile view 400 are shown as squares in FIG. 4, this is merely as an example and is not meant to be limiting. In some implementations, one or more tiles of the tile view 400 may have aspect ratio of 1:1. In some implementations, one or more tiles of the tile view 400 may have aspect ratio different than 1:1 (3:4; 4:3; 9:16; 16:9). In some implementations, one or more tiles of the tile view 400 may have aspect ratio of the corresponding media item(s). In some implementations, all tiles of the tile view 400 may have the same aspect ratio. In some implementations, separate tiles of the tile view 400 may have separate aspect ratios. In some implementations, all tiles on a single row of the tile view 400 may have the same height. In some implementations, all tiles on a single column of the tile view 400 may have the same width.

FIG. 5 illustrates an example zoom view 500. The zoom view 500 may include a layout for media items in which individual media items within a single collection are arranged below a preview section. For example, as shown in FIG. 5, the zoom view 500 may include a preview section 510 for individual media items within a single collection of media items. The preview section 510 may provide a preview of the individual media items within the single collection. Preview of the individual media items may include a presentation that cycles through different media items within the single collection, a presentation that shows snippets of videos within the single collection, a presentation that provides preview of (e.g., in lower resolution, in lower framerate) how the collection would be shown when played, and/or other preview of the media items.

The zoom view 500 may include media items 512, 514, 516 arranged below the preview section 510. Media items being arranged below the preview section may include the media items being completely below from the preview section, or the media items being partially below the preview section, such as shown in FIG. 5.

In some implementations, the arrangement of media items below the preview section may be automatically determined based on placement on center points for the media items along multiple sinusoidal pathways. Individual sinusoidal pathways may define potential points of placement for the media items. The sinusoidal pathways may travel along the same direction and may be separated by a distance. Center points placed on the sinusoidal pathways may define locations of placement of centers of the media items. Center points may correspond to locations at which the centers (e.g., horizontal center, vertical center, diagonal center, center of mass) of media items should be placed. For example, a center point may be placed on a sinusoidal pathway, and a center of a thumbnail of an image may be placed on top of the center point on the sinusoidal pathway.

The center points may be placed on the sinusoidal pathways so that the media items (e.g., thumbnails of media items) placed on top of the center points has an organic flow. The curve of the sinusoidal pathways may introduce the organic flow in the placement of the center points. The curve of the sinusoidal pathways may introduce intentional offset/non-alignment in the arrangement of the media items. That, the curve of the sinusoidal pathways may enable computer-generated arrangement of media items that are intentionally not aligned and/or non-uniformly spaced.

In some implementations, a group of adjacent center points may form a polygon. A group of adjacent center points may refer to multiple center points on the sinusoidal pathways that are next to each other. A group of adjacent center points may include three or more center points on two or more sinusoidal pathways. For example, a group of adjacent center points may include three adjacent center points on two (adjacent) sinusoidal pathways, and the three adjacent center points on the two sinusoidal pathways may form a polygon. Other numbers of center points and other numbers of sinusoidal pathways for the group of adjacent center points are contemplated.

In some implementations, the placement of the center points on the multiple sinusoidal pathways may be biased towards a group of three adjacent center points forming an equilateral triangle (a triangle with three equal sides). That is, the placement of the center points may be pushed, weighed, and/or otherwise biased so that a group of three adjacent center points (on two adjacent sinusoidal pathways) strives to form an equilateral triangle. Different groups of three adjacent center points may be biased towards forming equilateral triangles. Placement of a group of three adjacent center points being biased towards forming an equilateral triangle may include the center points being placed so that the group of three adjacent center points forms an equilateral triangles or the shape formed by the group of three adjacent center points being similar to an equilateral triangle. A triangle may be similar to an equilateral triangle based on the sides of the triangle being within threshold distance(s) of each other (e.g., deviation of the length of a side from the length of another side of the triangle is capped, such as by a minimum distance value or a maximum distance value) and/or based on inner angles being within threshold angle(s) of each other (e.g., deviation of an inner angle from 60 degrees is capped, such as by a minimum angle value or a maximum angle value).

For example, referring to FIG. 5, the media items 512, 514, 516 may be arranged within the zoom view 500 based on placement of center points for the media items 512, 514, 516 on two sinusoidal pathways. The center points for the media items 512, 516 may be placed on a top sinusoidal pathway while the center point for the media item 514 may be placed on a bottom sinusoidal pathways. The center points may be placed on the two sinusoidal pathways so that they form a triangular shape. Linking the centers of the media items 512, 514, 516 with line segments may result in a triangle.

In some implementations, a triangle formed by a group of three adjacent center points may deviate from the equilateral triangle to satisfy one or more constraints. A constraint may place limits on where the center points may be placed on the sinusoidal pathways. A constraint may bias the center point placement towards the center points being placed at certain locations on the sinusoidal pathways. For example, a triangle formed by a group of three adjacent center points may deviate from the equilateral triangle to satisfy an overlap constraint. That is, to satisfy the overlap constraint, the shape of the triangle formed by a group of three adjacent center points may not form an exact equilateral triangle. An overlap constraint may define one or more constraints of overlap between the media items. For example, an overlap constraint may set a maximum overlap between the media items, and if the placement of the center points results in the overlap between the media items exceeding the maximum overlap, the corresponding center points may be pushed apart so that the overlap does not exceed the maximum overlap. An overlap constraint may set a minimum overlap between the media items, and if the placement of the center points results in the overlap between the media items falling below the minimum overlap, the corresponding center points may be pushed closer together so that the overlap does not fall below the minimum overlap. An overlap constraint may set a target overlap between the media items, and the placement of the center points on the multiple sinusoidal pathways may be biased towards the media items having the target overlap. Other types of overlap constraint are contemplated.

A triangle formed by a group of three adjacent center points may deviate from the equilateral triangle to satisfy a gap constraint. That is, to satisfy the gap constraint, the shape of the triangle formed by a group of three adjacent center points may not form an exact equilateral triangle. A gap constraint may define one or more constraints of gap between the media items. For example, a gap constraint may set a maximum gap between the media items, and if the placement of the center points results in the gap between the media items exceeding the maximum gap, the corresponding center points may be pushed closer together so that the gap does not exceed the maximum gap. A gap constraint may set a minimum gap between the media items, and if the placement of the center points results in the gap between the media items falling below the minimum gap, the corresponding center points may be pushed apart so that the gap does not fall below the minimum gap. A gap constraint may set a target gap between the media items, and the placement of the center points on the multiple sinusoidal pathways may be biased towards the media items having the target gap. Other types of overlap constraint are contemplated. Other types of constraints are contemplated. Formation of other shapes/polygons by the adjacent center points are contemplated.

The zoom view 500 may present information relating to the single collection and/or the media items within the single collection. For example, the zoom view may present the title, date of capture, and/or location of capture of the single collection. Presentation of other information and other arrangements of related information are contemplated.

The zoom view 500 may not present all collections/media items at once. For example, in FIG. 5, there may be collections above and/or below the single collection shown. There may be media items to the left or right of the media items 512, 514, 416. A user may interact with the graphical user interface to see other collections and/or other media items. For example, a user may scroll up and down in the zoom view 500 to see other collections. A user may scroll left and right in the zoom view 500 to see other media items.

While only a single collection is presented within the zoom view 500 in FIG. 5, this is merely as an example and is not meant to be limiting. In some implementations, multiple collections may be presented within the zoom view 500. For example, the zoom view 500 may include full presentation of a single collection and partial presentations of adjacent collections. For instance, the zoom view 500 may show bottom parts of the media items in the above collection and may show top part of the preview section for the below collection.

In some implementations, the order in which the media items appears within a collection may determine the order in which the media items are arranged within the collection within the summary view 300, the tile view 400, and/or the zoom view 500. In some implementations, the order in which the media items appear within a collection may be changed via user interaction with the media items (previews/thumbnails of media items) within the summary view 300, the tile view 400, and/or the zoom view 500. For example, referring to FIG. 5, the single collection shown may include presentation, in order, of the media item 512, followed by the media item 514, followed by the media item 516. The order of the individual media items 512, 514, 516 arranged below the preview section 510 may be changeable (e.g., based on user interaction with a touchscreen display) to change order of presentation of corresponding media items within the single collection.

In some implementations, a collection of media items may be associated with a representative image. The representative image may provide visual representation of one or more media items within the collection. In some implementations, a representative image for a collection may be generated from a particular media item based on user interaction with the media item through the summary view 300, the tile view 400, and/or the zoom view 500. For example, the summary view 300, the tile view 400, and/or the zoom view 500 may provide one or more options for users to specify media items from which the representative image for a collection may be generated. As another example, a representative image for a collection may be generated from a media item based on the user dropping the media item into a preview section of the zoom view. For instance, referring to FIG. 5, a user may drag and drop the media item 514 into the preview section 510. Responsive to this action, a representation image for the corresponding collection may be generated from the media item 514.

In some implementations, the summary view 300, the tile view 400, and/or the zoom view 500 may provide one or more options for a user to edit media items, collections of media items, and/or metadata relating to the media items/collections of media items. For example, the summary view 300, the tile view 400, and/or the zoom view 500 may provide one or more options for a user make edits (e.g., image edit, video edit) to the media items, insert/remove/change highlights within the media items, add/remove/change media items within a collection, and/or other wise edit the media items, collections of media items, and/or related metadata. Other usage of the summary view 300, the tile view 400, and/or the zoom view 500 are contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
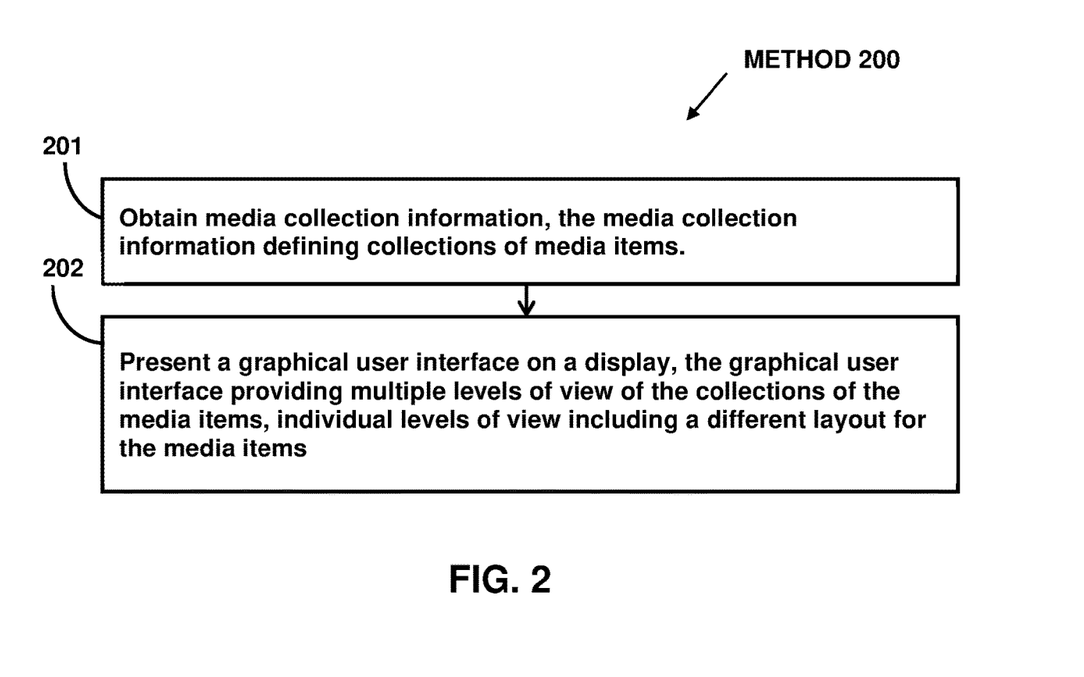
FIG. 2 illustrates a method for presenting an interface for media collections.

FIG. 2 illustrates method 200 for presenting an interface for media collection. The operations of method 200 presented below are intended to be illustrative. In some implementations, method 200 may be accomplished with one or more additional operations not described, and/or without one or more of the operations discussed. In some implementations, two or more of the operations may occur simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, media collection information and/or other information may be obtained. The media collection information may define collections of media items. In some implementations, operation 201 may be performed by a processor component the same as or similar to the media collection component 102 (Shown in FIG. 1 and described herein).

At operation 202, a graphical user interface may be presented on a display. The graphical user interface may provide multiple levels of view of the collections of the media items. Individual levels of view may include a different layout for the media items. The multiple levels of view may include a first level of view, a second level of view, and/or other levels of view. The first level of view may include a first layout for the media items and the second level of view may include a second layout for the media items. The first layout for the media items may be different from the second layout for the media items. In some implementations, operation 202 may be performed by a processor component the same as or similar to the graphical user interface component 104 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for presenting media collections, the system comprising:
   one or more physical processors configured by machine-readable instructions to:
      obtain media collection information, the media collection information defining collections of media items; and
      present a graphical user interface on a display, the graphical user interface providing multiple levels of view of the collections of the media items, individual levels of view including a different layout for the media items, wherein the multiple levels of view include a first level of view and a second level of view, the first level of view including a first layout for the media items and the second level of view including a second layout for the media items, the first layout for the media items different from the second layout for the media items, wherein the multiple levels of view include a zoom view, the zoom view including a preview section for individual media items within a single collection, the preview section providing a preview of the individual media items within the single collection by cycling through different media items within the single collection, the individual media items within the single collection arranged below and in front of the preview section within the zoom view, wherein one or more of the media items within the single collections cover one or more portions of the preview section;

wherein:

the arrangement of the individual media items below and in front of the preview section within the zoom view is determined based on placement of center points for the individual media items along multiple sinusoidal pathways, the multiple sinusoidal pathways including a first sinusoidal pathway and a second sinusoidal pathway, wherein the placement of the center points for the individual media items along the multiple sinusoidal pathways includes a first center of a first media item placed on the first sinusoidal pathway and a second center of a second media item placed on the second sinusoidal pathway;

the multiple sinusoidal pathways travel along a same direction and are separated by a distance, wherein the multiple sinusoidal pathways traveling along the same direction and being separated by the distance includes the first sinusoidal pathway and the second sinusoidal pathway traveling along the same direction and being separated by the distance; and the placement of the center points for the individual media items along the multiple sinusoidal pathways that travel along the same direction and are separated by the distance includes individual groups of three adjacent center points for three adjacent media items forming three points of a triangle to introduce offset in the arrangement of the individual media items below and in front of the preview section within the zoom view, wherein a first group of three adjacent center points for three adjacent media items includes a first adjacent center point and a third adjacent center point on the first sinusoidal pathway and a second adjacent center point on the second sinusoidal pathway.

2. The system of claim 1, wherein the multiple levels of view further include a summary view and a tile view.

3. The system of claim 2, wherein the summary view includes individual collections arranged in a first direction and individual media items within the individual collections arranged in a second direction perpendicular to the first direction.

4. The system of claim 3, wherein the individual collections are arranged vertically and the individual media items within the individual collections are arranged horizontally, wherein a first collection is above a second collection in the summary view and a first media item of the first collection is left of a second media item of the first collection in the summary view.

5. The system of claim 2, wherein the tile view includes individual media items within individual collections arranged as tiles.

6. The system of claim 5, wherein the individual media items within different collections are arranged in different rows or different columns in the tile view.

7. The system of claim 1 wherein a representative image for entirety of the single collection is generated based on dropping, by a user, of a given media item of the single collection in the preview section, wherein responsive to the user dropping a first media item of the single collection in the preview section, the representative image for the entirety of the single collection is generated from the first media item, and responsive to the user dropping a second media item of the single collection in the preview section, the representative image for the entirety of the single collection is generated from the second media item, the representative image for the entirety of the single collection providing visual representation of the media items within the single collection.

8. The system of claim 1, wherein the preview section of the zoom view further provides the preview of the individual media items within the single collection by providing a presentation of snippets of videos within the single collection.

9. The system of claim 1, wherein the preview section of the zoom view further provides the preview of the individual media items within the single collection by providing a lower-resolution preview or a lower-framerate preview of how the single collection would be shown when played.

10. The system of claim 1, wherein the distance by which the multiple sinusoidal pathways are separated includes a vertical separation distance and/or a phase separation distance.

11. A method for presenting media collections, the method performed by a computing system including one or more processors, the method comprising:

obtaining, by the computing system, media collection information, the media collection information defining collections of media items; and presenting, by the computing system, a graphical user interface on a display, the graphical user interface providing multiple levels of view of the collections of the media items, individual levels of view including a different layout for the media items, wherein the multiple levels of view include a first level of view and a second level of view, the first level of view including a first layout for the media items and the second level of view including a second layout for the media items, the first layout for the media items different from the second layout for the media items, wherein the multiple levels of view include a zoom view, the zoom view including a preview section for individual media items within a single collection, the preview section providing a preview of the individual media items within the single collection by cycling through different media items within the single collection, the individual media items within the single collection arranged below and in front of the preview section within the zoom view, wherein one or more of the media items within the single collections cover one or more portions of the preview section;

wherein:

the arrangement of the individual media items below and in front of the preview section within the zoom view is determined based on placement of center points for the individual media items along multiple sinusoidal pathways, the multiple sinusoidal pathways including a first sinusoidal pathway and a second sinusoidal pathway, wherein the placement of the center points for the individual media items along the multiple sinusoidal pathways includes a first center of a first media item placed on the first sinusoidal pathway and a second center of a second media item placed on the second sinusoidal pathway;

the multiple sinusoidal pathways travel along a same direction and are separated by a distance, wherein the multiple sinusoidal pathways traveling along the same direction and being separated by the distance includes the first sinusoidal pathway and the second sinusoidal pathway traveling along the same direction and being separated by the distance; and the placement of the center points for the individual media items along the multiple sinusoidal pathways that travel along the same direction and are separated by the distance includes individual groups of three adjacent center points for three adjacent media items forming three points of a triangle to introduce offset in the arrangement of the individual media items below and in front of the preview section within the zoom view, wherein a first group of three adjacent center points for three adjacent media items includes a first adjacent center point and a third adjacent center point on the first sinusoidal pathway and a second adjacent center point on the second sinusoidal pathway.

12. The method of claim 11, wherein the multiple levels of view further include a summary view and a tile view.

13. The method of claim 12, wherein the summary view includes individual collections arranged in a first direction and individual media items within the individual collections arranged in a second direction perpendicular to the first direction.

14. The method of claim 13, wherein the individual collections are arranged vertically and the individual media items within the individual collections are arranged horizontally, wherein a first collection is above a second collection in the summary view and a first media item of the first collection is left of a second media item of the first collection in the summary view.

15. The method of claim 12, wherein the tile view includes individual media items within individual collections arranged as tiles.

16. The method of claim 15, wherein the individual media items within different collections are arranged in different rows or different columns in the tile view.

17. The method of claim 11, wherein a representative image for entirety of the single collection is generated based on dropping, by a user, of a given media item of the single collection in the preview section, wherein responsive to the user dropping a first media item of the single collection in the preview section, the representative image for the entirety of the single collection is generated from the first media item, and responsive to the user dropping a second media item of the single collection in the preview section, the representative image for the entirety of the single collection is generated from the second media item, the representative image for the entirety of the single collection providing visual representation of the media items within the single collection.

18. The method of claim 11, wherein the preview section of the zoom view further provides the preview of the individual media items within the single collection by providing a presentation of snippets of videos within the single collection.

19. The method of claim 11, wherein the preview section of the zoom view further provides the preview of the individual media items within the single collection by providing a lower-resolution preview or a lower-framerate preview of how the single collection would be shown when played.

20. The method of claim 11, wherein the distance by which the multiple sinusoidal pathways are separated includes a vertical separation distance and/or a phase separation distance.

* * * * *